United States Patent
Allen et al.

(10) Patent No.: US 7,630,591 B2
(45) Date of Patent: Dec. 8, 2009

(54) OPTICAL FIBER SUBSTRATE USEFUL AS A SENSOR OR ILLUMINATION DEVICE COMPONENT

(75) Inventors: Philbrick Allen, Simpsonville, SC (US); Randolph S. Kohlman, Boiling Springs, SC (US); W. Randolph Hursey, LaGrange, GA (US); John G. Lever, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 17 days.

(21) Appl. No.: 12/157,617

(22) Filed: Jun. 12, 2008

(65) Prior Publication Data

US 2008/0253712 A1  Oct. 16, 2008

Related U.S. Application Data

(63) Continuation of application No. 11/139,124, filed on May 27, 2005, now abandoned.

(51) Int. Cl.
*G02B 6/00* (2006.01)
*G02B 6/12* (2006.01)

(52) U.S. Cl. .............. 385/12; 385/13; 385/14; 250/227.11; 250/227.14; 250/227.16; 250/227.18

(58) Field of Classification Search ............. 385/12–14; 250/227.11, 227.14, 227.16, 227.18
See application file for complete search history.

(56) References Cited

U.S. PATENT DOCUMENTS

| | | | | |
|---|---|---|---|---|
| 4,234,907 A |   | 11/1980 | Daniel | 362/556 |
| 4,367,460 A | * | 1/1983 | Hodara | 340/550 |
| 4,538,527 A | * | 9/1985 | Kitchen | 109/21 |
| 4,652,981 A |   | 3/1987 | Glynn | 362/103 |
| 4,727,603 A |   | 3/1988 | Howard | 2/115 |
| 4,754,372 A |   | 6/1988 | Harrison | 362/32 |

(Continued)

FOREIGN PATENT DOCUMENTS

WO  03/002380  1/2003

(Continued)

OTHER PUBLICATIONS

Luminescent Optical Fibers In Sensing. Grattan, K.T.V.; Zhang, Z.Y.; Sun, T. Department of Electrical, Electronic & Information Engineering, City University, London, UK. Optical Fiber Sensor Technology (1999), 4, 205-47.

(Continued)

*Primary Examiner*—Ryan Lepisto
(74) *Attorney, Agent, or Firm*—Cheryl J. Brickey

(57) ABSTRACT

This disclosure generally pertains to a method for manufacturing a distributed optical fiber scrim comprising a functional optical fiber, the functional optical fiber scrim thus manufactured, and composites in which an optical fiber scrim is incorporated. The present disclosure describes a variety of textile scrims, particularly adhesively bonded nonwoven scrim materials, each comprising at least one optical fiber with a continuous path across at least the length or width of the fabric. Such optical fiber scrims may be useful as sensor components (for example, as a detector of breakage, strain, pressure, or torque), as illumination components (for example, in a variety of light-providing applications), or as data-distribution components, either alone or in combination with other materials, such as fabrics, films, foams, and the like.

18 Claims, 7 Drawing Sheets

U.S. PATENT DOCUMENTS

| | | | | |
|---|---|---|---|---|
| 4,875,144 | A | | 10/1989 | Wainwright ................. 362/103 |
| 5,015,842 | A | * | 5/1991 | Fradenburgh et al. .. 250/227.15 |
| 5,086,378 | A | | 2/1992 | Prince ......................... 362/103 |
| 5,193,129 | A | * | 3/1993 | Kramer ........................ 385/13 |
| 5,424,922 | A | | 6/1995 | Wise ........................... 362/554 |
| 5,567,932 | A | | 10/1996 | Staller et al. ........... 250/227.14 |
| 5,592,149 | A | * | 1/1997 | Alizi .......................... 340/550 |
| 5,722,757 | A | | 3/1998 | Chien ......................... 362/555 |
| 6,145,551 | A | * | 11/2000 | Jayaraman et al. ...... 139/387 R |
| 6,217,188 | B1 | | 4/2001 | Wainwright et al. ........ 362/103 |
| 6,299,104 | B1 | | 10/2001 | El-Sherif et al. ............. 244/142 |
| 6,381,482 | B1 | * | 4/2002 | Jayaraman et al. .......... 600/388 |
| 6,563,107 | B2 | * | 5/2003 | Danisch et al. ......... 250/227.14 |
| 6,687,523 | B1 | * | 2/2004 | Jayaramen et al. .......... 600/388 |
| 6,709,142 | B2 | | 3/2004 | Gyori .......................... 362/554 |
| 6,713,733 | B2 | | 3/2004 | Kochman et al. ........... 219/549 |
| 6,727,197 | B1 | * | 4/2004 | Wilson et al. ................ 442/301 |
| 6,771,852 | B2 | | 8/2004 | Hemenway et al. ........... 385/24 |
| 6,856,715 | B1 | * | 2/2005 | Ebbesen et al. ................ 385/14 |
| 6,930,820 | B1 | * | 8/2005 | Shooks et al. ................ 359/325 |
| 6,995,353 | B2 | * | 2/2006 | Beinhocker ............ 250/227.14 |
| 7,189,959 | B1 | * | 3/2007 | Morison et al. ........ 250/227.14 |
| 2004/0240776 | A1 | | 12/2004 | Baur et al. ..................... 385/16 |
| 2005/0146076 | A1 | * | 7/2005 | Alexander et al. .......... 264/257 |
| 2005/0151067 | A1 | | 7/2005 | Beinhocker ............ 250/227.15 |
| 2005/0151068 | A1 | | 7/2005 | Beinhocker ............ 250/227.15 |
| 2005/0151069 | A1 | | 7/2005 | Beinhocker ............ 250/227.15 |

FOREIGN PATENT DOCUMENTS

| | | |
|---|---|---|
| WO | 2004/098239 | 11/2004 |

OTHER PUBLICATIONS

Non-linear distributed optical-fiber sensing. Rogers, A. J. Dep. Electron. Electr. Eng., King's Coll. London, London, UK. Proceedings of SPIE-The International Society for Optical Engineering (1993), 1797 (Distributed and Multiplexed Fiber Optic Sensors II), 50-62.

Distributed optical-fiber sensing. Rogers, A. J. Dep. Electron. Electr. Eng., King's Coll., London, UK. Proceedings of SPIE-The International Society for Optical Engineering (1991), 1504 (Fiber-Opt. Metrol. Stand.), 2-24.

Status of fiber-optic sensing. Davis, Charles M. Opt. Technol., Inc., Herndon, VA, USA. Proceedings of SPIE-The International Society for Optical Engineering (1988),959 (Optomech. Electro-Opt. Des. Ind. Syst.), 60-65.

Novel optical fibers for sensing applications. Gambling, W. A. Dep. Electron. Comp. Sci., Univ. Southampton, Southampton, UK. *Journal of Physics E: Scientific Instruments* (1987), 20(9), 1091-96.

Sensing ammonia with ferrocene-based polymer coated tapered optical fibers. Shadaram, Mehdi; Martinez, Juan; Garcia, Fernando; Tavares, David. Department Electrical Computer Engineering, University Texas-El Paso, El Paso, TX, USA. *Fiber and Integrated Optics* (1997), 16(1), 115-122.

Chemical sensing by surface plasmon resonance in a multimode optical fiber. Trouillet, A.; Ronot-Trioli, C.; Veillas, C.; Gagnaire, H. Laboratoire Traitement du Signal et Instrumentation, CNRS-URA, Fr. *Pure and Applied Optics* (1996), 5(2), 227-237.

Phase-sensitive polarimetric sensing in the evanescent field of single-mode fibers. Lehmann, H.; Lippitsch, M. E.; Ecke, W.; Haubenreisser, W.; Willsch, R.; Raabe, D. Institut fuer Physikalische Hochtechnologie, Helmholtzweg 4, Jena, Germany. *Sensors and Actuators, B: Chemical* (1995), B29(1-3), 410-15.

Optical fiber chemical sensor. Minami, Shigeo. Fac. Eng., Osaka Univ., Suita, Japan. *Oyo Butsuri* (1986), 55(1), 56-62.

Optical sensing of pH in low ionic strength waters. Swindlehurst, Ben R.; Narayanaswamy, Ramaier. Department of Instrumentation and Analytical Science, UMIST, Manchester, UK. *Springer Series on Chemical Sensors and Biosensors* (2004), 1(Optical Sensors), 281-308.

Recent progress in fiber optic pH sensing. Baldini, Francesco. Ist. Ric. Onde Electromagn., CNR, Florence, Italy. Proceedings of SPIE-The International Society for Optical Engineering (1991), 1368 (Chem., Biochem., Environ. Fiber Sens. 2), 184-90.

Evanescent sensing of biomolecules and cells. Haddock, Hong S.; Shankar, P. M.; Mutharasan, R. Department of Chemical Engineering, Drexel University, Philadelphia, PA, USA. *Sensors and Actuators, B: Chemical* (2003), B88(1), 67-74.

Application of an optical fiber-sensing technique for nuclear power plant monitoring. Eiji, Takada; Nakazawa, Masaharu. Study Applying Optical Fiber Sensing Technique Nuclear Plant Monitoring, Fac. Eng., Univ. Tokyo, Tokyo, Japan. *Hoshasen* (1997), 23(3), 51-61.

Neutron-sensing scintillating glass optical fiber detectors. Bliss, M.; Reeder, P. L.; Craig, R.A. Pacific Northwest Laboratory, Richland, WA, USA. *Nuclear Materials Management* (1994), 23, 583-588.

Conception of an ionizing radiation detection scheme based on controlled light induced annealing of silica fibers. Vassilopoulos, C.; Kourtis, A.; Mantakas, C. Natl. Cent. Sci. Res., Inst. Inf. Telecommunicat., Athens, Greece. *IEE Proceedings-J: Optoelectronics* (1993), 140(4), 267-72.

Distributed sensing of strain in synthetic fiber rope and cable constructions using optical fiber sensors. Uttamchandani, Deepak G.; Culshaw, Brian; Overington, M. S.; Parsey, M.; Facchini, Massimo; Thevenaz, Luc. Dep. Electronic Electr. Eng., Univ. of Strathclyde, Glasgow, UK. *Proceedings of SPIE-The International Society for Optical Engineering* (1999), 3860(Fiber Optic Sensor Technology and Applications), 273-275.

Novel fiber grating sensing technique based on the torsion beam. Zhang, Weigang; Feng, Dejun; Ding, Lei; Zhang, Ying; Dong, Xin-Yong; Zhao, Chunliu; Dong, Xiaoyi. Institute of Modern Optics, Nankai Univ., Tianjin, Peop. Rep. China. *Proceedings of SPIE-The International Society for Optical Engineering* (2000), 4082 (Optical Sensing, Imaging, and Manipulation for Biological and Biomedical Applications), 157-160.

A high spatial resolution distributed optical fiber sensor for high-temperature measurements. Feced, Ricardo; Farhadiroushan, Mahmoud; Handerek, Vincent A.; Rogers, Alan J. Department of Electronic and Electrical Engineering, King's College London, Strand, London, UK. *Review of Scientific Instruments* (1997), 68(10), 3772-3776.

Distributed sensing technique based on Brillouin optical-fiber frequency-domain analysis. Garus, Dieter; Krebber, Katerina; Schliep, Frank; Gogolla, Torsten. Ruhr-Universitaet Bochum, Bochum, Germany. *Optics Letters* (1996), 21(17), 1402-1404.

Temperature sensing elements. Meijer, Gerard; Herwaarden, Sander van; Kapsenberg, Theo; Venema, Adrian. Department Electrical Engineering, Delft University Technology, Delft, Neth. Editor(s): Meijer, Gerard C. M.; van Herwaarden, A. W. *Therm. Sens.* (1994), 90-133.

* cited by examiner

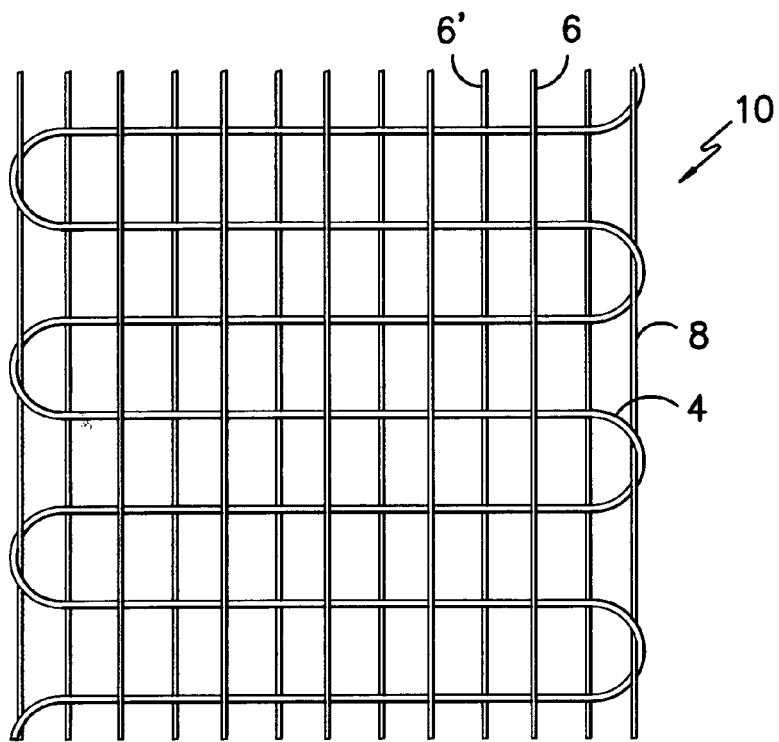
FIG. -1-
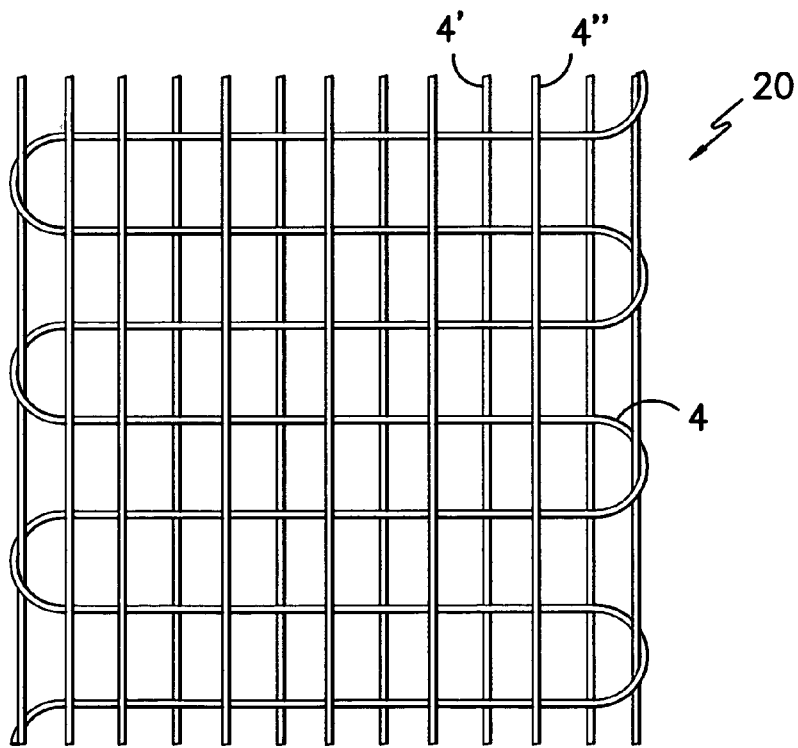
FIG. -2-

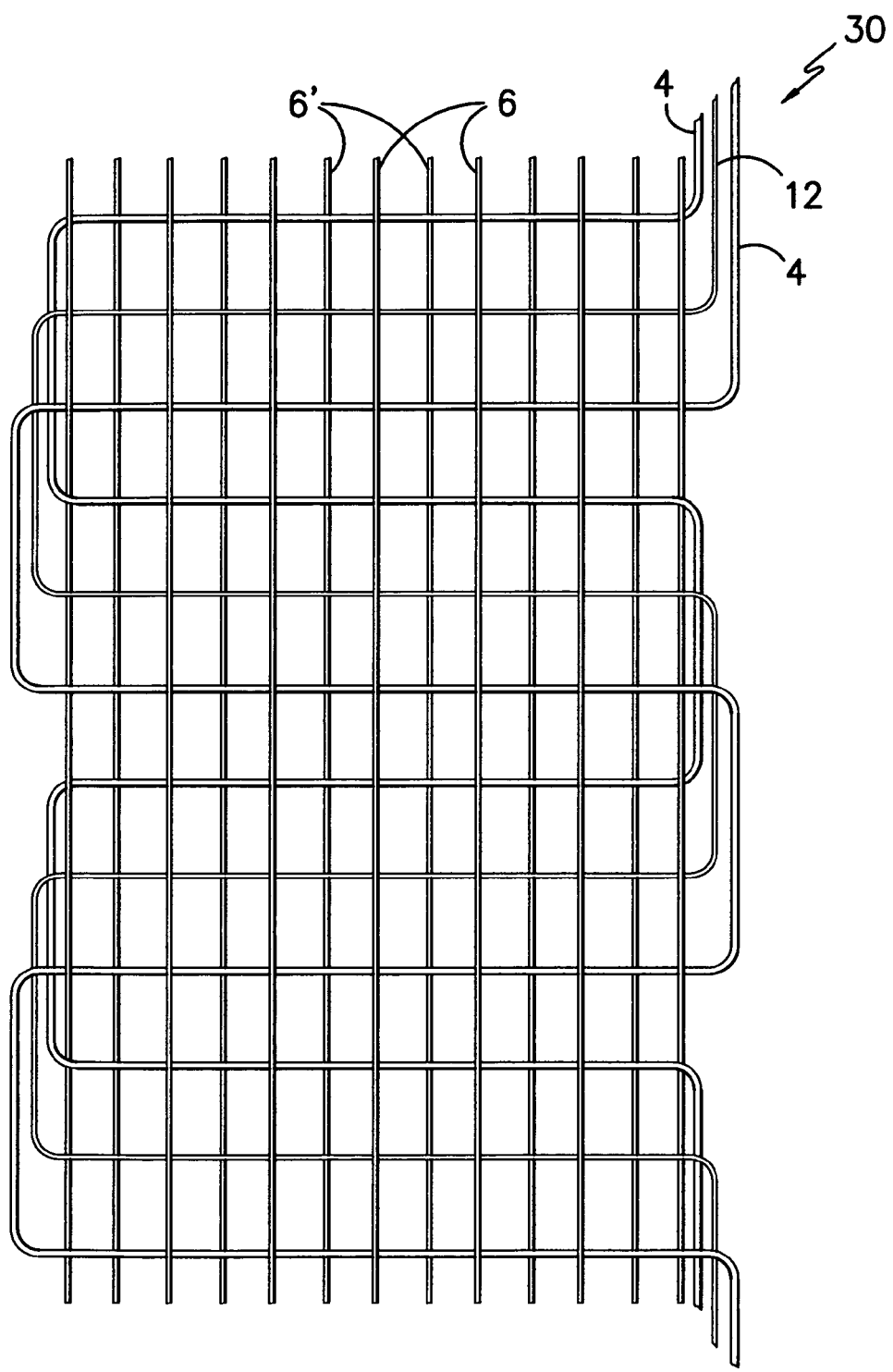
FIG. -3-

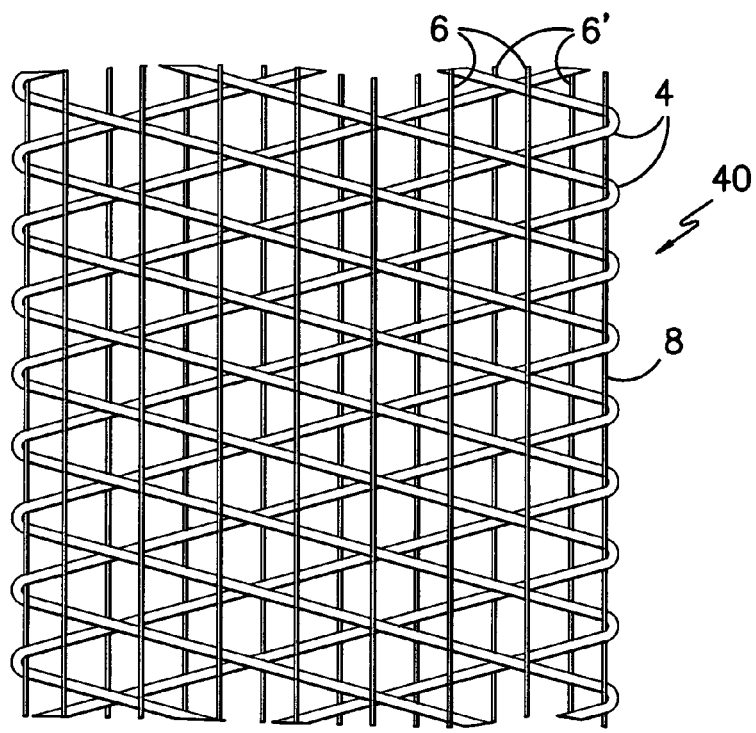
FIG. -4-
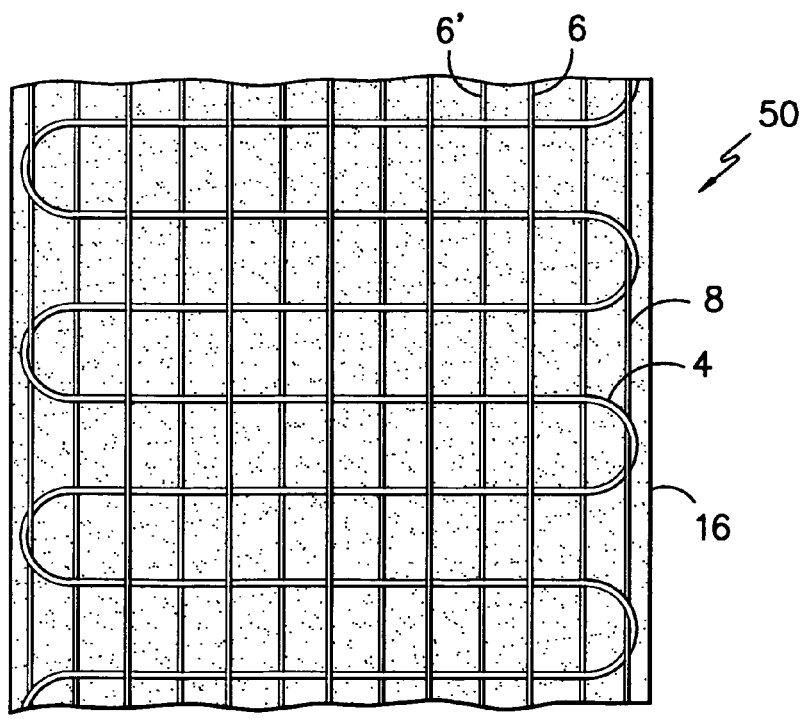
FIG. -5A-

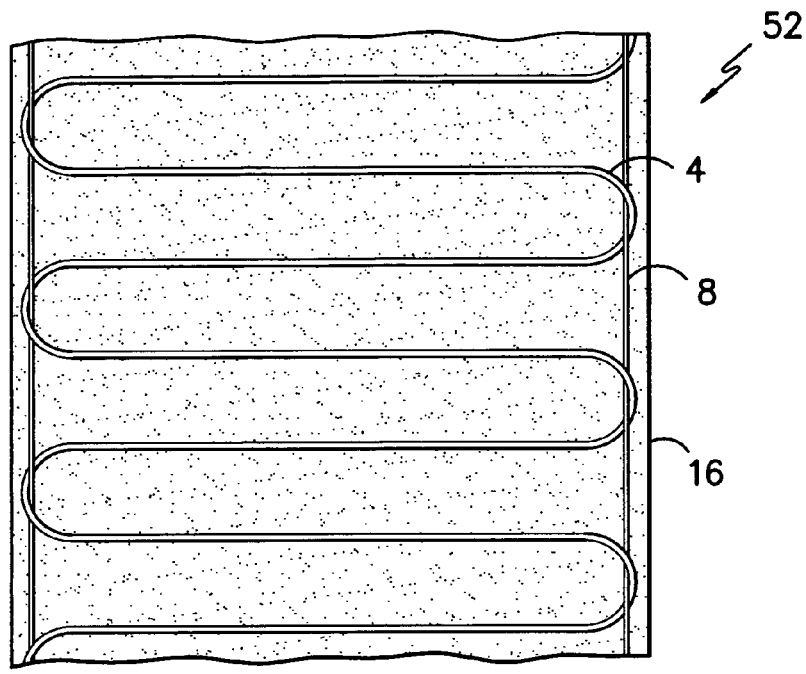
FIG. -5B-
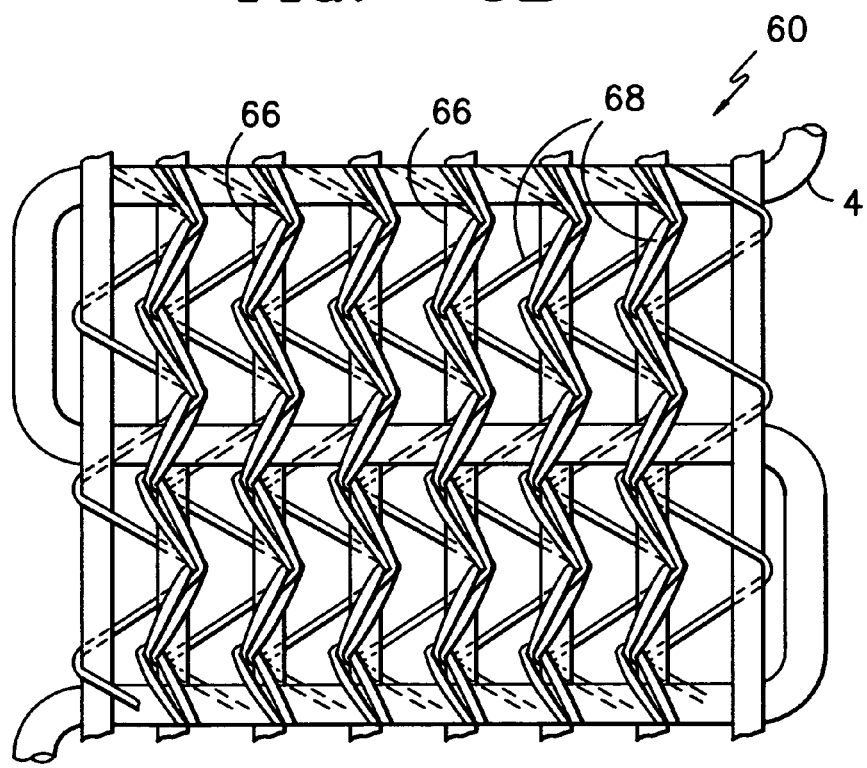
FIG. -6-

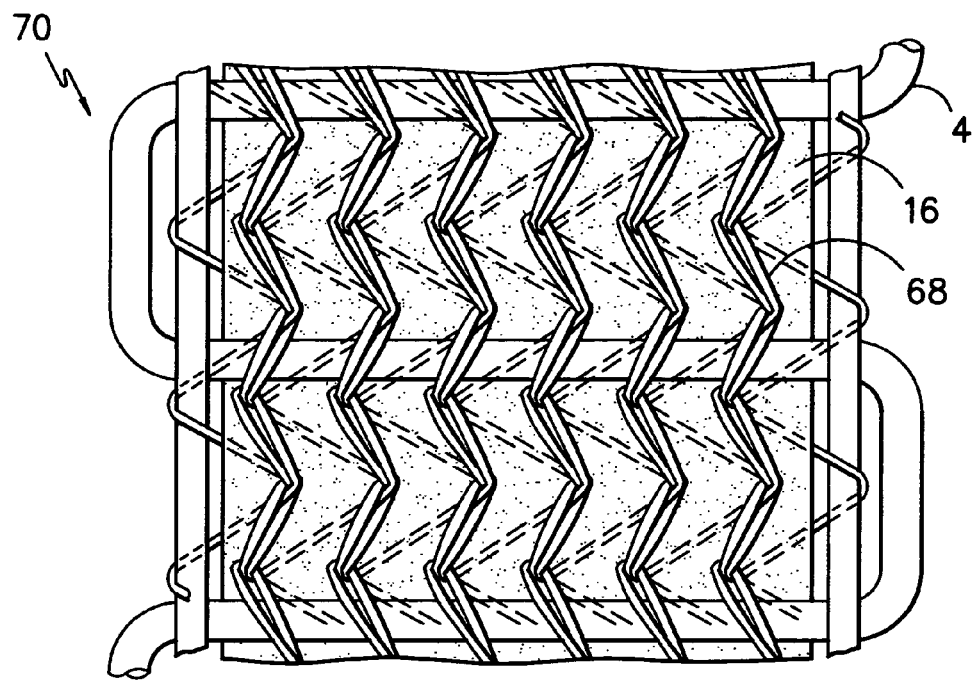
FIG. -7-
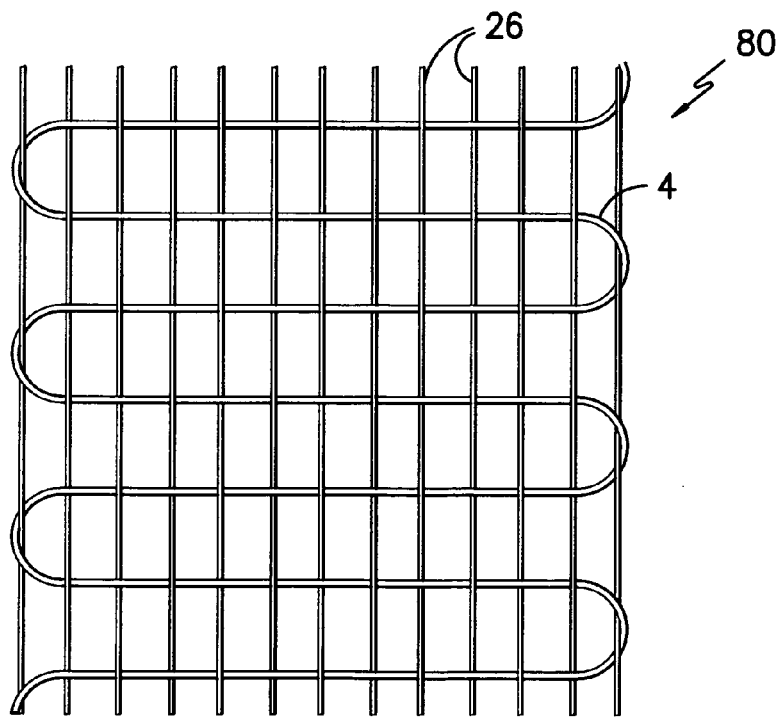
FIG. -8-

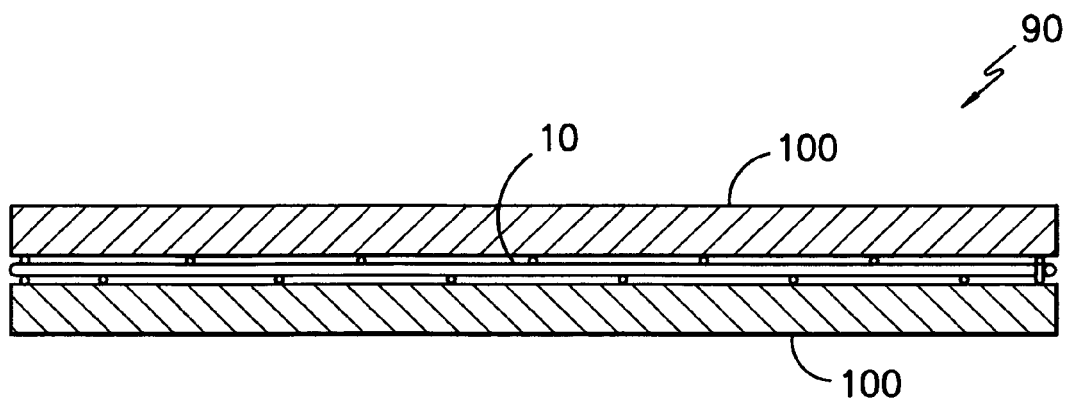
FIG. -9A-
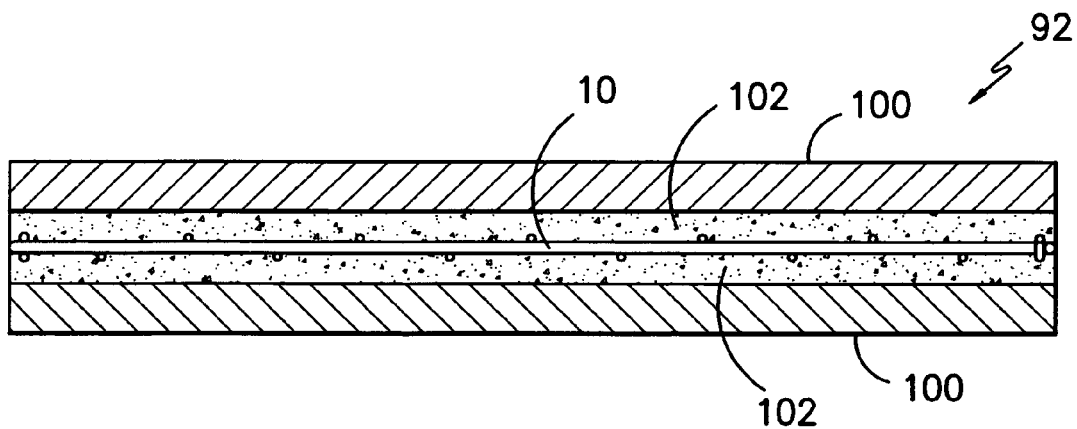
FIG. -9B-

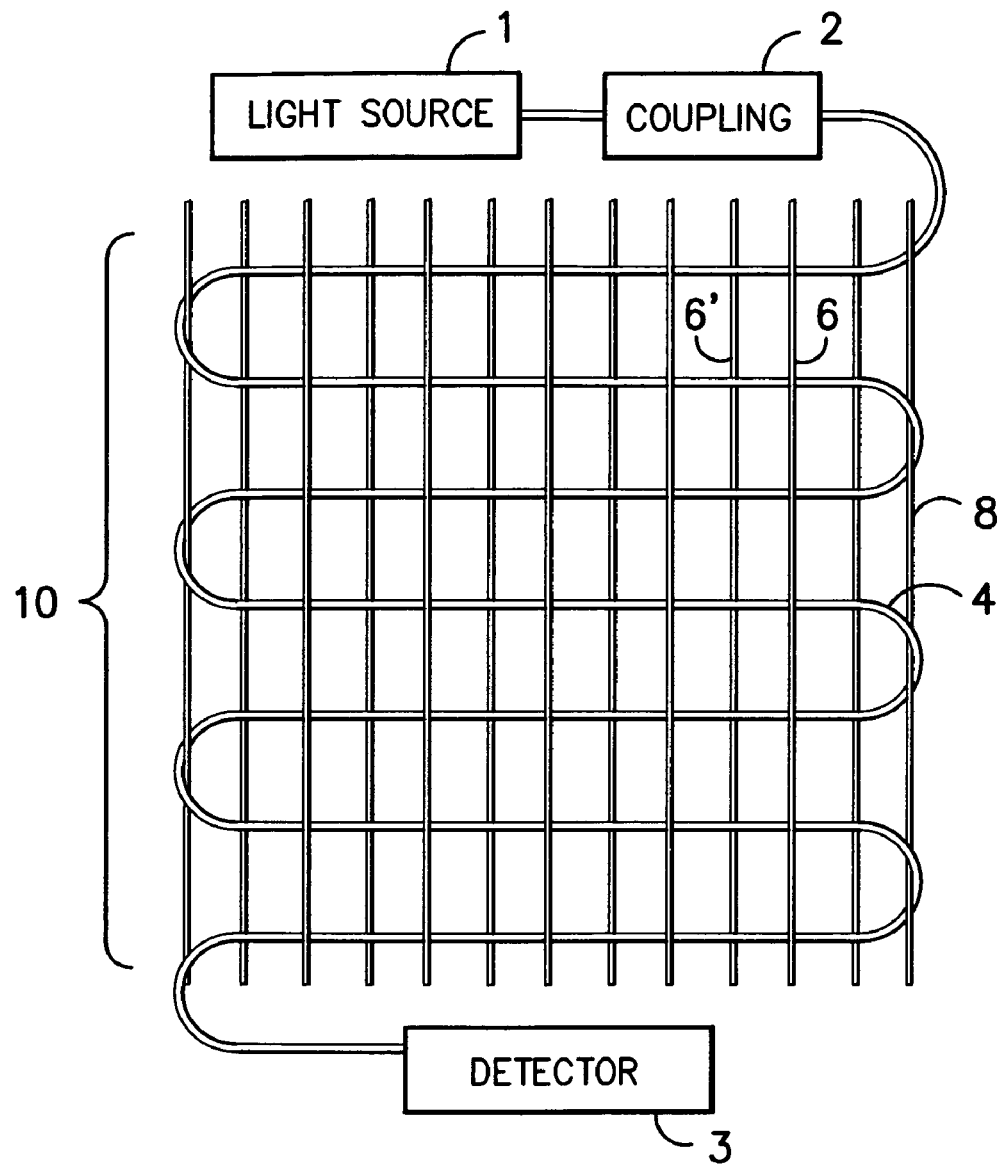
FIG. —10—

OPTICAL FIBER SUBSTRATE USEFUL AS A SENSOR OR ILLUMINATION DEVICE COMPONENT

RELATED APPLICATIONS

This application is a Continuation of U.S. application Ser. No. 11/139,124, filed on May 27, 2005, now abandoned, and is herein incorporated by reference.

TECHNICAL FIELD

This disclosure generally pertains to a method for manufacturing a distributed optical fiber scrim comprising a functional optical fiber, the functional optical fiber scrim thus manufactured, and composites in which an optical fiber scrim is incorporated. Such optical fiber scrims may be useful as sensor components (for example, as a detector of breakage, strain, pressure, or torque), as illumination components (for example, in a variety of light-providing applications), or as data-distribution components. The present disclosure describes a variety of textile scrims, particularly adhesively bonded nonwoven scrim materials, each comprising at least one optical fiber with a continuous path across at least the length or width of the fabric.

BACKGROUND

Historically, optical fibers have been added to textile structures, laminates, or composites to take advantage of the functional attributes of these fibers, such as the ability to transmit light, and data encoded in the light, over extended distances. In addition, modifications to the fiber—such as mechanical notches in the coating and/or fiber, small radius bends in the fiber, or chemical modifications of the cladding or protective layers of the optical fiber—can result in light leakage from the fiber and a decreased light transmission. If the decreased light transmission is due to interaction with an external stimulus, then the light leakage may be used to provide sensing properties. Changes in the polarization of the light signal input or in the propagation mode, interference effects, or other pertinent optical parameter changes may also be manipulated to obtain a desired effect on, for instance, the sensing functionality of the textile substrate. Alternately, the light leakage from the fiber optics may provide intentional illumination effects to the textile product.

Approaches Using Fiber Optics to Produce Illumination

In some applications, the light-carrying and light-distributing functions of optical fibers are used to provide lighting effects or directed illumination capacity to a fabric.

U.S. Pat. No. 4,234,907, for instance, discloses the use of optical fibers to replace some of the traditional yarns in a woven fabric. The optical fiber surfaces are intentionally scratched so that light can escape from the fibers and provide an overall illumination to the woven fabric. There are many parallel optical fibers in this application, which are necessarily grouped together at their ends to allow light to be coupled into the whole array, thereby illuminating the whole fabric panel. Incorporation of the optical fiber into a woven structure results in the fibers being exposed to crimp, or small radius bends. The optical fiber is incorporated either in the warp direction or the fill direction. In the fill direction, a special machine is used that leaves fiber optic "tails" on only one selvage.

U.S. Pat. No. 4,652,981 takes advantage of the light-carrying capability of optical fibers to create an illuminated belt. In this application, the optical fibers are not integrated into a textile but loosely bundled into a tube.

U.S. Pat. No. 4,727,603 describes feeding multiple side-emitting optical fibers through a fabric and attaching them to an aesthetic side of the fabric for lighted aesthetics on that surface. The fibers are bundled on the non-aesthetic side of the fabric to introduce the light into them. This manner of incorporating optical fibers typically is a more labor-intensive way to distribute fiber optics on a surface, because the fibers were added to the textile after the textile was manufactured, rather than being integrated during fabric formation.

U.S. Pat. No. 4,875,144 is a variation of the '603 patent, in which the optical fibers are grouped into bundles so that different colors of light can be transmitted into different bundles. U.S. Pat. No. 6,217,188 is another variant of the previous approaches, which uses color-changeable light-emitting diodes and a brightness control to produce a more eye-catching visual display featuring the fiber optics. In U.S. Pat. No. 5,424,922, a similar construction is applied to create illuminated safety apparel. In U.S. Pat. No. 5,722,757, a light emitting diode and a non-uniformly side-emitting optical fiber are incorporated onto a soft object to provide illumination to, for instance, a shoe.

U.S. Pat. No. 4,754,372 discloses a floor or wall covering composite with a fibrous face from which the optical fibers project to provide lighting effects. In this approach, multiple parallel optical fibers are grouped to bundle light into them. The optical fibers are incorporated into a composite structure but the fibers themselves are not integral in any single textile component. U.S. Pat. No. 6,709,142 discloses a glove with optical fiber ribbons disposed between an inner and outer layer of the glove, such that light can leak out from the glove to provide illumination for the user.

Approaches using Fiber Optics as Sensor Components

In other textile applications, manufacturers took advantage of the sensitivity of the optical fiber to its state of mechanical flexure, twist, elongation, breakage, or the chemical state in which the fiber exists and the accompanying optical index of refraction changes of the fiber optical system (which result in changes in how the light propagates through the optical fiber).

For example, in U.S. Pat. No. 5,567,932, multiple parallel optical fibers are incorporated into a waste containment geomembrane. They are described as being laminated into the structure or integral to the textile. They are incorporated in parallel in the longitudinal direction. The optical fibers are bundled to input light. Transmission of light through the optical fibers is monitored to look for breaches, slope creep, subsidence, leachate levels, fires, and types of material present and leaking from the site. The patent does not provide details as to how the fiber is incorporated into the textile. Laying the optical fiber into the composite involves additional processes and labor compared with incorporating it directly into the textile.

In U.S. Pat. No. 6,145,551, a woven product is disclosed that incorporates optical fibers as data transmission lines or sensing lines. U.S. Pat. No. 6,381,482 further broadens this concept to include tubular, flat woven, or knitted products with incorporated optical and electrical fibers for sensing. The fabric must be comfortable as well as functional, since it is to be worn close to a person's skin for monitoring their vital signs. U.S. Pat. No. 6,687,523 discloses using the above article with a means for communicating to an external device, and a means for ensuring a snug fit, to make a garment to monitor the vital signs of an infant (for instance, to prevent sudden infant death syndrome). These textiles, which are designed to be comfortable and durable for use in apparel, are also highly constructed.

Another example of a wearable textile with integrated optical fibers is disclosed in U.S. Pat. No. 6,727,197. The optical fiber is used in a data or power transmission cable that is woven, knitted, or braided. The fabric is easy to manufacture, washable, corrosion resistant, and has high fatigue strength. Because the fabric is designed to be worn, it also has a very full-faced textile construction typical of apparel fabrics.

In U.S. Pat. No. 6,299,104, a set of optical fibers is attached to a parachute, along with light sources and detectors, for monitoring the loads exerted on a parachute during deployment. The optical fiber detection system is attached to the parachute after it is created and, therefore, it is not integral to the textile. Additionally, there are significant labor issues involved in putting the system together.

In US Published Patent Application 2004/0240776A1, the use of optical fibers in a textile for a seat occupation sensor is disclosed. The optical fiber-based sensor detects microbends or modifications of the Bragg wavelength caused by loads positioned on the seat. The optical fiber can be woven into the cover of the seat or into the cushion.

Hence, there have been many textile-based products that utilize optical fibers integrated into the textile, attached to the textile, or incorporated into a composite with a textile for lighting or sensing. However, the articles disclosed use multiple parallel optical fibers and do not include a single optical fiber disposed in a sinuous manner along the textile. Use of a single fiber that is distributed over the whole width and/or length of the textile article can simplify an optical circuit, such as is necessary for a sensing or light-emitting device, since only a single light source and, optionally, a single detector are needed.

Further, having the optical fiber directly integrated into the textile structure allows ease of incorporation of the associated textile into composites, for instance, and insures repeatable placement of the optical fiber. Many of the existing articles described above require post-production attachment of the optical fiber system into the article (that is, the fiber optics are secured to the textile after the textile is manufactured). The present disclosure provides a fiber optic fabric, in which the optical fibers are integrated into the fabric construction.

In a few instances, the optical fiber is directly incorporated into a woven, knit, or braided fabric to produce a fabric with high durability to abrasion, flex, washing, and the like. In these embodiments, a high degree of small radius bends, or crimp, may be imparted to the optical fiber during fabric production, resulting in substantial inability to transmit light without loss. In applications where the optical fiber path is very long, this light loss due to optical fiber crimp may be unacceptable. The present disclosure addresses this problem by providing a family of scrim fabrics, where an optical fiber is integrated in a manner substantially free of small radius bends. Optionally, a continuous length of a single fiber can be extended throughout the fabric.

Because the economics of optical fiber typically dictates sparing use of the fiber, a textile utilizing an optical fiber as a component may preferably be embodied as an open construction, such as a scrim, where there is substantial open space between adjacent yarns. The present disclosure provides a variety of scrim fabrics in which an optical fiber is integrated. Due to its open construction, such an article may be more easily incorporated into a variety of composites including resin impregnated composites (thermosetting or thermoplastic), textile composites, cementitious composites, laminates with various flexible, rigid, and semi-rigid substrates such as wood, metal sheets, foils, multi-ply lay ups, and the like. It is to be understood that there is no requirement that the composite itself have an open construction, rather only that the scrim fabric have such a construction.

Other objects and advantages of the present approach are described herein.

OBJECTS OF THE PRESENT DISCLOSURE

It is an object of the current disclosure to provide a textile substrate with an open construction, commonly referred to as a scrim, in which the scrim possesses at least one integrated optical fiber for providing sensing properties, illumination properties, or data transmission properties.

It is a further object to provide a textile scrim where at least a single optical fiber can be distributed over the whole surface of the textile, preferably in a sinuous path across its width, thereby providing uniform sensitivity or illumination over the surface of the textile. Optionally, or additionally, one or more optical fibers may be extended in substantially parallel paths throughout the length (machine direction) of the textile scrim.

It is another object of this disclosure to provide a textile scrim in which the optical fiber is incorporated with minimal crimp, so that unwanted loss of light from the fiber can be minimized.

It is yet another object of the present disclosure to provide a textile scrim with either a square or angled pattern for the optical fiber as it is distributed over the surface of the textile.

It is a further object of the disclosure to provide a textile substrate that, due to its open construction, may be easily incorporated into a variety of composites including resin-impregnated composites, textile composites, cementitious composites, laminates with various flexible, rigid, and semi-rigid substrates such as wood, metal sheets, foils, multiply lay ups, and the like.

It is another object of the disclosure to provide a scrim that provides the functionality of the optical fiber, as well as reinforcing or tensile properties attributable to the remaining yarns in the scrim.

It is yet another object of the present disclosure to provide a readily manufacturable optical fiber configuration, or optical circuit, which can be incorporated into illumination, sensing, or data-distribution products.

It is in addition an object of the current disclosure to be able to provide a distributed network of optical fibers for monitoring conditions over a distributed surface, such as, for example, stress in a structural composite part like an aircraft hull or bridge or environmental conditions in a reactor, where the stress may be indicated, for instance, by breaks in the optical fiber.

SUMMARY

The present disclosure is directed to a textile scrim material in which at least a single continuous optical fiber is preferably incorporated in the cross-machine direction, the machine direction, or both. The resulting functional material may be used as a sensing element, as a light-providing element, or as a data-distributing element, either alone or in combination with other materials. The scrim material may be an adhesively bonded laid scrim, a thermally bonded laid scrim, a weft-inserted warp knit scrim, a multi-axial knit scrim, a woven scrim, a cross-plied scrim, or a stitch-bonded scrim. In one embodiment, manufacturing of the scrim and the ultimate functional composite is simplified because a single optical fiber is distributed in a sinuous path along the length of the textile.

BRIEF DESCRIPTION OF THE DRAWINGS

FIG. 1 is a plan view of a textile scrim material, in which a continuous optical fiber, laid in a sinuous path, comprises the weft;

FIG. 2 is a plan view of a textile scrim material, in which optical fibers comprise the warp and weft;

FIG. 3 is a plan view of a textile scrim material, in which multiple optical fibers, laid in sinuous paths, comprise the weft;

FIG. 4 is a plan view of a tri-axial textile scrim fabric, in which optical fibers, laid in a sinuous path, comprise the weft;

FIG. 5A is a plan view of a composite, in which an optical fiber scrim is combined with a layer of film or fabric;

FIG. 5B is a plan view of a composite, in which an optical fiber scrim with only selvage yarns is combined with a layer of film or fabric;

FIG. 6 is a plan view of a weft-inserted warp knit fabric, in which an optical fiber, laid in a sinuous path, comprises the weft;

FIG. 7 is a plan view of a stitch-bonded fabric that has been stitched to a nonwoven sheet, wherein an optical fiber, laid in a sinuous path, comprises the weft of the stitch-bonded fabric;

FIG. 8 is a plan view of a woven scrim fabric in which an optical fiber, incorporated in a sinuous path, comprises the fill;

FIG. 9A is a cross-sectional view of a composite material, including an optical fiber scrim as its central layer; and FIG. 9B is a cross-sectional view of an alternate composite material, including an optical fiber scrim as its central layer.

FIG. 10 shows a light source connected to a coupling which directs the light into a first side of an optical fiber. The light exits the second side of the optical fiber and was directed into a detector.

DETAILED DESCRIPTION

Types of Optical Fiber

Optical fiber is commonly used, for instance, in the telecommunications industry, to transmit signals over a long distance using light pulses with very little loss of signal. Optical fibers typically have at least three parts: a core, a cladding, and a buffer coating.

The core, where the light travels, is typically made of glass (such as silica), which has been engineered to minimize absorptive or scattering loss. Alternately, the core may also be made of a polymer, such as polymethylmethacrylate (PMMA) or polystyrene, though these cores tend to attenuate light more. The core typically has a cylindrical shape and is the center of the optical fiber.

The cladding is an outer material that surrounds the core and that has a lower optical index of refraction than the core. This index of refraction mismatch at the boundary between the core and cladding causes light that impinges on the cladding layer from the core to reflect back into the core, assuming the angle of impingement is less than a critical angle. This reflection is called "total internal reflection," and is the basic principal by which optic fibers are able to transmit light with low loss over long distances. For angles larger than the critical angle, light may leak out from the core and result in signal attenuation.

One of the advantages of optical fiber is that it can transmit light even if the optical fiber is bent, twisted, or otherwise mechanically deformed. However, if the optical fiber is exposed to a bending radius beneath a critical bend radius, the transmission of light through the fiber may be dramatically reduced. Typical glass-core optical fibers have a minimum bend radius of about 1 inch, while polymer-core optical fibers have a minimum bend radius of about 0.125 cm.

The buffer coating is typically a plastic coating over the core and cladding that protects them from moisture and damage. In some embodiments, the buffer coating may not be present. In some potentially preferred embodiments, the buffer coating is made of a material (such as PVC) that is readily compressible, thereby reducing the likelihood of the fiber optic from being crimped or fractured from incidental contact. Additional layers may be added to the basic layers above, depending on the requirements of the product.

Optical fibers are offered either as single-mode or multi-mode fibers. The single-mode fibers tend to have smaller diameter cores (on the order of about 10 microns) and transmit infrared light at specific wavelengths with low attenuation. The light travels only in a single path through this fiber, creating a well-defined optical profile, which depends on the geometry of the fiber, the index of refraction profile, and the wavelength of light propagated. These single-mode fibers provide high information-carrying capacity and low attenuation.

Multi-mode fibers, in contrast, tend to have larger diameter cores (on the order of about 60 microns), which allow a broader range of infrared light to be transmitted. However, multi-mode fibers also exhibit a higher attenuation than single-mode fibers. The light transmitted through a multi-mode fiber travels over more paths, resulting in a less well-defined optical profile.

Either single-mode or multi-mode fibers may be used for many applications. For applications in which less attenuation is desirable (e.g., in many sensing applications), use of a single-mode fiber may be preferred.

Increasingly, in addition to those described above, other types of optical fibers—such as light pipes, photosensitive fibers, polarization maintaining fibers, multiple step-indexed fibers, graded index fibers, reduced cladding fibers, high index fibers, wave-guiding films, and photonic lattice fibers—are available. All of these variations of optical fiber could be incorporated into the present optical fiber substrate for use in different applications. These different types of optical fiber are generally well described in technical and product literature and information regarding these can be readily found on the Internet (for instances, at manufacturers' websites).

As has been described, optical fibers are currently deployed in a wide variety of applications. They can be employed in data transmission, for instance as land lines for the telecommunications industry to transmit high-density signals. They have been employed as light-guiding elements or light pipes, either to provide aesthetic or functional illumination or to transmit light to remote locations where it is inconvenient to incorporate separate light sources. One example of this approach is the use of optical fibers to bring concentrated laser light into the body during minimally invasive surgeries. Optical fibers are also used to transmit images from difficult-to-reach locations to locations where they can be more usefully analyzed or captured. The area of distributed lighting is becoming increasingly of interest. A high intensity light at one location is capable of providing light to a variety of locations by distribution through collections of light pipes.

Because transmission of light through optical fibers is affected by the geometry of the fiber as well as the chemical/optical characteristics of the parts of the fiber, there are many aspects of the fiber that allow it to be used as a sensor. For instance, dramatic changes to the fiber (such as breaking it) can effect transmission of light, but also more subtle effects— like bending the fiber, mechanically elongating or straining the fiber, exposing it to chemicals that change the index of refraction of the core or cladding layers, exposing it to temperature or humidity changes, or exposing it to ionizing radiation that affects the absorptive losses of the core—may affect the fiber's ability to transmit light.

Uses of Optical Fiber for Sensing

The use of optical fibers for sensing purposes is well-documented in the technical literature, representative examples of which are included in the following list.

Luminescent optical fibers in sensing. Grattan, K. T. V.; Zhang, Z. Y.; Sun, T. Department of Electrical, Electronic & Information Engineering, City University, London, UK. *Optical Fiber Sensor Technology* (1999), 4, 205-247.

Sensing system using plastic optical fiber. Muto, Shinzo; Morisawa, Masayuki. Grad. Sch. Med. Eng., Univ. Yamanashi, Kofu, Japan. *Oyo Butsuri* (2004), 73(11), 1423-1427.

Non-linear distributed optical-fiber sensing. Rogers, A. J. Dep. Electron. Electr. Eng., King's Coll. London, London, UK. Proceedings of SPIE-The International Society for Optical Engineering (1993), 1797 (Distributed and Multiplexed Fiber Optic Sensors II), 50-62.

Distributed optical-fiber sensing. Rogers, A. J. Dep. Electron. Electr. Eng., King's Coll., London, UK. Proceedings of SPIE-The International Society for Optical Engineering (1991), 1504 (Fiber-Opt. Metrol. Stand.), 2-24.

Status of fiber-optic sensing. Davis, Charles M. Opt. Technol., Inc., Herndon, Va., USA. Proceedings of SPIE-The International Society for Optical Engineering (1988), 959 (Optomech. Electro-Opt. Des. Ind. Syst.), 60-65.

Novel optical fibers for sensing applications. Gambling, W. A. Dep. Electron. Comp. Sci., Univ. Southampton, Southampton, UK. *Journal of Physics E: Scientific Instruments* (1987), 20(9), 1091-96.

Optical fibers are increasingly being used to provide sensing functionality either into systems or composite structures, by choosing cladding materials for the optical fiber whose index of refraction changes upon exposure to chemical agents, moisture, pH changes, or biological sources. The chemicals that can be sensed include hydrocarbons, such as are used for fuels, or dangerous process chemicals, as might be employed in manufacturing operations. In addition, optical fibers can be made sensitive to neutrons and ionizing radiation from nuclear materials.

Examples of technical literature related to optical fibers with sensitivity to the stimuli listed above include:

Sensitivity to Chemicals

Sensing ammonia with ferrocene-based polymer coated tapered optical fibers. Shadaram, Mehdi; Martinez, Juan; Garcia, Fernando; Tavares, David. Department Electrical Computer Engineering, University Texas-El Paso, El Paso, Tex., USA. *Fiber and Integrated Optics* (1997), 16(1), 115-122.

Chemical sensing by surface plasmon resonance in a multimode optical fiber. Trouillet, A.; Ronot-Trioli, C.; Veillas, C.; Gagnaire, H. Laboratoire Traitement du Signal et Instrumentation, CNRS-URA, Fr. *Pure and Applied Optics* (1996), 5(2), 227-237.

Phase-sensitive polarimetric sensing in the evanescent field of single-mode fibers. Lehmann, H.; Lippitsch, M. E.; Ecke, W.; Haubenreisser, W.; Willsch, R.; Raabe, D. Institut fuer Physikalische Hochtechnologie, Helmholtzweg 4, Jena, Germany. *Sensors and Actuators, B: Chemical* (1995), B29(1-3), 410-15.

Optical fiber chemical sensor. Minami, Shigeo. Fac. Eng., Osaka Univ., Suita, Japan. *Oyo Butsuri* (1986), 55(1), 56-62.

Sensitivity to pH Changes

Optical sensing of pH in low ionic strength waters. Swindlehurst, Ben R.; Narayanaswamy, Ramaier. Department of Instrumentation and Analytical Science, UMIST, Manchester, UK. *Springer Series on Chemical Sensors and Biosensors* (2004), 1(Optical Sensors), 281-308.

Recent progress in fiber optic pH sensing. Baldini, Francesco. Ist. Ric. Onde Electromagn., CNR, Florence, Italy. Proceedings of SPIE-The International Society for Optical Engineering (1991), 1368 (Chem., Biochem., Environ. Fiber Sens. 2), 184-90.

Sensitivity to Biological Sources

Evanescent sensing of biomolecules and cells. Haddock, Hong S.; Shankar, P. M.; Mutharasan, R. Department of Chemical Engineering, Drexel University, Philadelphia, Pa., USA. *Sensors and Actuators, B: Chemical* (2003), B88(1), 67-74.

Sensitivity to Nuclear Materials

Application of an optical fiber-sensing technique for nuclear power plant monitoring. Eiji, Takada; Nakazawa, Masaharu. Study Applying Optical Fiber Sensing Technique Nuclear Plant Monitoring, Fac. Eng., Univ. Tokyo, Tokyo, Japan. *Hoshasen* (1997), 23(3), 51-61.

Neutron-sensing scintillating glass optical fiber detectors. Bliss, M.; Reeder, P. L.; Craig, R. A. Pacific Northwest Laboratory, Richland, Wash., USA. *Nuclear Materials Management* (1994), 23, 583-588.

Conception of an ionizing radiation detection scheme based on controlled light induced annealing of silica fibers. Vassilopoulos, C.; Kourtis, A.; Mantakas, C. Natl. Cent. Sci. Res., Inst. Inf. Telecommunicat., Athens, Greece. *IEE Proceedings-J: Optoelectronics* (1993), 140(4), 267-72.

Optical fibers may also be used to sense a variety of mechanical changes to a system, such as breakage, strain, pressure, torsion, torque, acceleration, and rotation. Such sensing can be particularly useful for smart monitoring systems for structural composites, such as bridges or airplane hulls, to sense impending failures. Other optical fiber systems can be useful for making temperature measurements over a wide range of temperatures with spatial resolution. Such temperature measurements could be useful in manufacturing process reactors, in buildings for internal temperature control, and the like.

Based on analytical measurement techniques, optical fiber sensors can be used as interferometric sensors, absorption thermometers, heterodyne sensors, Bragg grating sensors, backscatter systems, anti-Stokes thermometry, polarization optical time domain reflectometry, and Raman, Brillouin, and optical Kerr effect sensors, as well as simple break detectors.

Examples of technical literature related to optical fibers use to sense mechanical changes, such as those listed above include:

Sensitivity to Strain

Distributed sensing of strain in synthetic fiber rope and cable constructions using optical fiber sensors. Uttamchandani, Deepak G.; Culshaw, Brian; Overington, M. S.; Parsey, M.; Facchini, Massimo; Thevenaz, Luc. Dep. Electronic Electr. Eng., Univ. of Strathclyde, Glasgow, UK. *Proceedings of SPIE-The International Society for*

*Optical Engineering* (1999), 3860(Fiber Optic Sensor Technology and Applications), 273-275.

Sensitivity to Torque
Novel fiber grating sensing technique based on the torsion beam. Zhang, Weigang; Feng, Dejun; Ding, Lei; Zhang, Ying; Dong, Xin-Yong; Zhao, Chunliu; Dong, Xiaoyi. Institute of Modern Optics, Nankai Univ., Tianjin, Peop. Rep. China. *Proceedings of SPIE-The International Society for Optical Engineering* (2000), 4082 (Optical Sensing, Imaging, and Manipulation for Biological and Biomedical Applications), 157-160.

Sensitivity to Temperature
A high spatial resolution distributed optical fiber sensor for high-temperature measurements. Feced, Ricardo; Farhadiroushan, Mahmoud; Handerek, Vincent A.; Rogers, Alan J. Department of Electronic and Electrical Engineering, King's College London, Strand, London, UK. *Review of Scientific Instruments* (1997), 68(10), 3772-3776.

Distributed sensing technique based on Brillouin optical-fiber frequency-domain analysis. Garus, Dieter; Krebber, Katerina; Schliep, Frank; Gogolla, Torsten. Ruhr-Universitaet Bochum, Bochum, Germany. *Optics Letters* (1996), 21(17), 1402-1404.

Temperature sensing elements. Meijer, Gerard; Herwaarden, Sander van; Kapsenberg, Theo; Venema, Adrian. Department Electrical Engineering, Delft University Technology, Delft, Neth. Editor(s): Meijer, Gerard C. M.; van Herwaarden, A. W. *Therm. Sens.* (1994), 90-133.

Optical fibers, in addition, have certain advantages over electrical systems for sensing. Fiber optic strands do not corrode. Since they do not carry a current, they are unlikely to induce sparks or ignitions. They are not sensitive to electromagnetic impulses, like electrical conductors. Therefore, the broad applicability of optical fibers for sensing different stimuli, or optionally providing illumination or carrying information, as well as environmental stability make them of high value for incorporation into functional products.

Optical Fiber Substrate Constructions

To provide a regular, manufacturable optical fiber circuit, which can be handled and/or incorporated into functional products, the optical fiber is preferably incorporated into a textile scrim.

As used herein, the term "scrim" shall mean a fabric having an open construction used as a base fabric or a reinforcing fabric, which may be manufactured as an adhesively or thermally bonded laid scrim, a woven scrim, a weft-inserted warp knit scrim, a multi-axial knit scrim, a stitch-bonded scrim, or a cross-plied scrim. These scrims may be attached to a carrier layer, such as a film or a fabric web, during manufacture.

The open structure of a scrim fabric facilitates the ease with which the scrim may be incorporated into a composite structure. Particularly in those applications where an adhesive is used to bond multiple layers, the openness of the scrim allows adhesive flow-through, which results in a stronger bond between the composite components.

Scrims, as described herein, contain at least one set of warp yarns and at least one crossing yarn. Preferably, the warp yarn set contains between about 1 yarn per 60 inches and about 25 yarns per inch; more preferably, the warp yarn set contains between about 1 yarn per 30 inches and about 12 yarns per inch; and most preferably, the warp yarn set contains between about 1 yarn per inch and about 8 yarns per inch. The warp yarn density may be determined by any of a number of factors, including, for instance, the tensile requirements of the final product. Also, it is to be understood that that scrims with a low warp yarn density (e.g., of about 1 yarn per 60 inches) may be directly attached to a flexible carrier sheet to provide additional mechanical stability.

Preferably, the crossing yarn is present at a spacing of between about 1 yarn per 10 inches and 24 yarns per inch; more preferably, the crossing yarn is present at between about 1 yarn per 4 inches and 12 per inch; and most preferably, the crossing yarn is present at between about 1 yarn per 2 inches and 8 per inch. It should be understood that the crossing yarn spacing may be achieved by positioning multiple fibers on the warp yarn set or by positioning a single fiber, so that it curves back and forth across the width of the fabric, as will be described further herein.

For purposes of this disclosure, the scrims of interest allow for at least a single continuous path of optical fiber to be laid or incorporated into the fabric. In a first embodiment, at least one optical fiber is used in the warp direction, typically as part of a warp yarn set in which a plurality of yarns extend in a substantially straight path along the length of the fabric. In this embodiment, the term "continuous" refers to the path of an unbroken, or unsegmented, optical fiber in the warp direction.

In a second embodiment, where at least one optical fiber is incorporated in the weft direction, the optical fiber(s) are positioned in a sinuous path across the width of the scrim. The term "sinuous" refers to a path of a single optical fiber, which winds or curves back and forth, preferably across the width of the scrim. Although a regular (i.e., symmetrical and sine-shaped) curve may be preferred, it is not necessary. Similarly, although having the sinuous optical fiber path extend substantially across the width of the fabric may be preferred, this requirement is not mandatory. It should also be noted that the sinuous path may overlap itself, if, for instance, the optical fiber shifts between the time the optical fiber is laid and the time it is secured by adhesive, thermal bonding, stitching, or the like. Finally, it is to be understood that multiple sinuous paths may be present in the same scrim fabric.

In one preferred embodiment, the crossing yarn is an optical fiber. When an optical fiber is used as the crossing yarn, the spacing of the fiber is dictated by the minimum bending radius that the optical fiber may realize without experiencing significant attenuation. Optical fibers having cores made of glass typically have a minimum bending radius of about 1 inch, while optical fibers having polymer cores have minimum bending radii of as low as about 0.125 cm.

Optical fibers tend to act like monofilaments when the optical fibers are incorporated into a textile fabric. As a result, these optical fibers must be handled carefully during processing and fabric formation to produce a functional fabric. Optical fibers, like many other monofilaments, are typically packaged on a spool with flanges on each end, where the flanges prevent the yarns from being sloughed off (as might occur due to the low surface friction of the yarn).

If the fiber begins to slough off the package, it may become twisted or knotted with itself, causing it to break. At a minimum, the knotted yarn results in a stoppage in the manufacturing process and in defects in the scrim. Monofilament-like yarns also exhibit a tendency to twist in any manufacturing process that involves rotating the yarn continuously in the same direction. Such twisting may cause the monofilament, such as an optical fiber, to kink and/or break or at least to distort the geometry of the resulting scrim. In addition, some optical fibers may have a very low tensile strength, causing them to break when tension impulses are applied to them, such as at startup.

To address these difficulties, the optical fiber may be fed into the machine in several different ways. The optical fiber may be placed in a barrel, or similar containment, with walls that prevent the optical fiber from sloughing off of the package and becoming twisted and then may be fed to the scrim formation machine through an orifice in the barrel's lid. Another option is to use a driven roll to feed the fiber optic into a scrim formation machine, where the rate of the driven roll is optimized to avoid tension impulses. Alternately, before the yarn is fed to the scrim formation machine, a yarn accumulator can be used to protect the yarn from tension impulses, as well as introduce some twist to the yarn that may counterbalance the twist imposed during the scrim formation process.

Besides the tendency to twist, which can lead to breaks, optical fibers have a unique problem associated with the bending of the fiber. Optical fibers may be bent only to a certain critical bending radius before light begins to leak out of the fiber and increases the attenuation. This characteristic puts functional limits on the radius bend that the fiber may experience in application without severe attenuation losses, depending on the type of fiber used. This sensitivity to bending radius is mitigated by the open construction of a scrim. Because there is substantial space between neighboring warp or weft yarns, the loops on the selvage may be of sufficient radius that the optical fibers do not begin to attenuate light.

Bonded Laid Scrims

There are a variety of fabric formation technologies that can provide a scrim fabric with incorporated optical fiber. One preferred method involves forming an adhesively bonded scrim, as shown in FIG. 1. This method of forming an optical fiber substrate 10 involves forming two sets of warp yarns, an upper set 6 and a lower set 6', between which a continuous cross-machine direction yarn 4 (in this case, a continuous optical fiber) is laid in a sinuous path.

The yarns of warp sets 6, 6' may be selected from any commercially available yarn known in the art, including spun yarns, multi-filament yarns, or monofilament yarns, which are made of polyester, polyamides, polyolefin, ceramic, fiberglass, basalt, carbon, aramid, metal, or combinations thereof. The warp yarns 6, 6' may additionally be twisted, covered, and/or plied. They optionally may be single component or bi-component yarns, such as a sheath-core fiber with a low-melt adhesive material in the sheath. Preferably, warp yarns 6, 6' are either polyester or fiberglass.

Also shown in FIG. 1 are selvage yarns 8, which secure the desired dimensions of optical fiber substrate 10. Selvage yarns 8 preferably are chosen to have a higher strength than the remainder of warp yarns 6, 6', so that more tension may be applied to selvage yarns 8 to maintain the width of substrate 10 and the geometry of the weft yarns. It is to be understood that the denier of the warp yarns 6, 6' determines the strength of substrate 10 and yarns 6, 6' may be chosen to provide reinforcement to substrate 10. Therefore, yarns of any denier may be used, as may meet the strength requirements of the final product (i.e., either substrate 10 or a composite containing substrate 10).

In one embodiment, cross-machine direction yarn 4 (preferably, the optical fiber) can be inserted between warp yarn sets 6, 6', using a set of rotating screws on opposite ends of the warp sheets and a single rotating arm that passes the yarn between the two screws as it rotates. As the screws turn, they insert the yarns extending between them into the warp sheets at a fixed number per inch to provide the desired construction. This has the effect of placing a single yarn in what is termed a "square pattern" into the warp sheets, as shown in FIG. 1.

The square pattern includes a cross-direction yarn, incorporated in a sinuous path, crossing the warp sheet at nearly a right angle, forming a loop on the edge of the warp sheet, and crossing the warp sheet again, nearly at a right angle, in the opposite direction at some fixed spacing from the first yarn and so on. The pitch between the flights on the screw determines the spacing between the yarns. The spacing can be adjusted by changing out the screw in the machinery. Because the cross-direction yarn is not interlaced or looped around the majority of the other yarns at close spacing, the cross-direction yarn is introduced into the fabric with minimal yarn crimp (small radius bends in the yarn). The yarns are held taut in their position to maintain the geometry of the scrim by using the selvage yarns, which have a high tension applied to them, around which the cross-directional yarns are looped.

Depending on residual twist in the yarn, the cross-directional (i.e., fiber optic) yarns may have a tendency to move, so that the resulting scrim does not have a square pattern, but one in which the optical fibers move on the warp sheet. To the extent that the ability of the optical fiber to transmit light is not impeded by this motion, this irregularly patterned scrim may be perfectly acceptable for the applications of interest. In those cases where the cross-directional yarns, preferably optical fibers, move, the optical fibers may be constrained from moving by directly attaching the scrim to a carrier substrate and adhesively bonding the scrim in place.

In a preferred adhesively or thermally bonded scrim, where the weft yarns are comprised of optical fibers, the warp yarns are disposed at approximately 1 end per 2 inches to 25 ends per inch, and the weft yarns comprised of optical fibers are disposed at approximately 1 optical fiber per 10 inches up to 12 optical fibers per inch. A more preferred fabric construction is from about 1 to 12 ends per inch in the warp and from about 1 optical fiber per 4 inches to 8 optical fibers per inch in the weft direction. A most preferred construction is from about 1 to 8 warp ends per inch and from about 1 optical fiber per 2 inches to about 4 optical fibers per inch. As previously mentioned, if high light transmission for the optical fiber is desired, the spacing for the optical fiber (wefts per inch) will necessarily be dictated by the minimum bending radius that the fiber can withstand before light begins to leak at the bended regions.

In an alternate embodiment, separate optical fibers can be placed into the fabric construction both in the machine direction as well as in the cross-direction, as shown in FIG. 2. In this embodiment, optical fibers are incorporated into warp yarn sets 4' and 4", between which cross-machine directional yarn 4 (also an optical fiber) is laid. The resulting optical fiber substrate 20 possesses multiple different sensing paths, illumination lines, data-distribution lines, or combinations thereof, which provide different geometrical pathways through substrate 20. Although illustrated with all yarns being comprised of optical fibers, a combination of optical fibers and non-optical fibers may be used instead to provide mechanical strength to the scrim in addition to optical functionality.

FIG. 3 illustrates an adhesively bonded nonwoven scrim material 30, in which a plurality of yarns 4, 12 are laid in the cross-machine direction. Again, warp yarn set 6 is positioned above cross-directional yarns 4, 12, while warp yarn set 6' is positioned below cross-directional yarns 4, 12. As shown, yarns 4 are optical fibers. Yarn 12 is a fiber of a different type, such as a polyester or fiberglass yarn, for example. Although three cross-directional yarns are shown in FIG. 3, any number of yarns may be used, limited only by the capabilities of the equipment. Further, although FIG. 3 shows two optical fibers in the cross-machine direction, all of the cross-machine direction yarns may be optical fibers, as well as, or alternately, some or all of the yarns in the warp yarn sets.

By incorporating multiple optical fibers in the same textile, the possibility exists to include fibers with sensitivity to different environmental sources (e.g., certain chemicals and moisture). Alternately, for instance, optical fibers having sensing capabilities may be used in combination with optical fibers providing data distribution or illumination functionality. The different optical fibers may also represent different data distribution nodes.

In an alternate embodiment, multiple cross-directional yarns may be laid between the warp sheets concurrently in an angled configuration. For instance, up to 96 yarn spools may be attached to a rotating shaft and fed into different flights of the screws simultaneously. Using this approach, the fabric construction would no longer exhibit a square pattern, but rather would exhibit what is termed a "tri-axial" pattern as shown in FIG. 4. In a tri-axial construction, plural weft yarns 4 having both an upward diagonal slope and a downward diagonal slope are located between plural longitudinal warp yarns 6, 6' that are located above and below weft yarns 4 to create tri-axial scrim 40. In this case, one or more of the cross-directional yarns 4 may be an optical fiber (as shown, both cross-directional yarns are optical fibers).

The preferred range of the fabric construction of tri-axial optical fiber substrate is between approximately 25×4×4 (25 ends per inch in the warp direction, 4 ends per inch on the upward diagonal slope in the weft direction, and 4 ends per inch on the downward diagonal slope in the weft direction) and 2×⅙×⅙ (2 ends per inch in the warp direction and 1 end per every 6 inches on the upward diagonal slope in the weft direction, and 1 end per every 6 inches on the downward diagonal slope in the weft direction), and is most preferably 8×½×½ (8 ends per inch in the warp direction and 1 end per every 2 inches on the upward diagonal slope in the weft direction, and 1 end per every 2 inches on the downward diagonal slope in the weft direction). As has been previously mentioned, the spacing of the optical fiber (wefts per inch) will necessarily be dictated by the minimum bending radius that the fiber can withstand before light begins to leak at the bend. The warp yarn density may be determined, for instance, by tensile requirements of the final product.

As has been mentioned, for both the bidirectional and tri-directional scrims (as shown in FIGS. 1-4), an alternate embodiment for which the optical fiber path extends in the machine direction in parallel paths can be obtained by forming a warp beam in which the optical fiber replaces one or many of the conventional warp yarns at whatever spacing is desired. In this manner, optical fibers can be made to traverse the length of the scrim. Again, the optical fiber would be put into the scrim construction in a fairly straight manner to minimize yarn crimp. In a variation of this approach, the optical fiber may be used in combination with non-optical fibers (e.g., fiberglass or polyester) to create a warp yarn set, in which adjacent yarns may be of different types.

Whether the cross-directional yarns are inserted in either the square or tri-axial fabric, as described above, they are preferably permanently locked into place. This is typically accomplished with an adhesive composition. During the initial part of fabric formation, the yarns are held in place only by friction between overlapping yarns. Typically, the construction is then transported (a) over rollers directly into a chemical dip that coats the fabric with an adhesive, (b) through a nip (or set of squeeze rolls) to squeeze off excess adhesive, and (c) into an oven or over a set of steam- or oil-heated cans to dry and cure the adhesive. The buffer coating on the optical fiber is preferable for protecting the fiber from manufacturing-induced attenuation caused by pressure damage to the core or cladding at the nip roll.

The adhesive used to bind the warp yarns and cross-directional yarns to one another may be chosen from materials such as polyvinyl alcohol (PVOH), acrylic, polyvinyl acetate, polyvinyl chloride, polyvinylidiene chloride, polyacrylate, acrylic latex, styrene butadiene rubber (SBR), EVA, plastisol, or any other suitable adhesive. Further, these yarns optionally could be thermally bonded to form the optical fiber substrate if an appropriate low-melt material is present as part of the yarn system.

Alternate embodiments of the previously described scrims may be obtained by modifying the set-up for producing these scrims. Using additional rolls before the adhesive nip, a flexible carrier sheet, such as a nonwoven (for example, a spun-bonded nonwoven, a melt-blown nonwoven, or a carded nonwoven web), a woven or knitted textile, a film, a paper roll, or a foil, may be introduced as the scrim is formed. In this case, the carrier sheet, such as a nonwoven, can provide structural support so that the amount of warp yarn required to hold the scrim together can be drastically reduced. This embodiment is shown in FIG. 5A, in which an optical fiber substrate having warp yarn sets 6, 6', selvage yarns 8, and a cross-machine yarn 4, preferably made of optical fiber, are combined with a layer of material 16 to create a composite 50. Although a thin layer of nonwoven fabric may be preferred in some applications, layer 16 may be comprised instead of materials such as a single or multi-layer film, a woven fabric layer, a foam layer, a composite layer, and the like, depending on the properties desired in the final product.

To reduce warp yarns to a minimum, illustrated in FIG. 5B, selvage yarns 8 alone may be used to hold optical fiber 4 across the fabric width, and all additional warp yarns can be removed. This scrim (made of optical fiber 4 and selvage yarns 8) is laid directly onto flexible layer 16 and passed through the adhesive or thermal bonding zone to hold the optical yarns directly to the flexible carrier substrate 16 and create a composite 52. A less extreme example (not shown) may include, for instance, using only a single sheet of the warp yarns while the scrim is formed.

In the most extreme example, the selvage yarns, as well as the warp sheets, are removed and the optical fiber is laid in a sinuous path directly onto the carrier sheet. By combining the flexible carrier with the sinuous path of optical fiber attached and a second flexible carrier with only unidirectional yarns attached (for example, only warp yarns), a cross-plied scrim with attached carrier layers may be formed. Using this approach, the optical fibers could be used in the machine direction, in the cross-machine direction, or both.

Weft-Inserted Warp Knit Scrims

Yet another means for forming a scrim with a continuous optical fiber is to construct a fabric using a weft inserted warp knit machine, as may be available from, for instance, Liba Corporation or Mayer Corporation. Such machines are equipped with a hook system at either side of the warp sheet, such that as the weft carriage introduces the yarns as it moves back and forth, the weft yarns loop around the hooks and, typically after indexing, may be inserted continuously. In one embodiment, one or more optical fibers are inserted. Optionally, one or more optical fibers, plus additional yarns, which may provide additional weft direction tensile strength to the scrim, are all inserted into the scrim. The weft-inserted yarns are attached to the warp sheet using a knit stitch such as a tricot stitch, flat stitch, or some combination thereof. With this construction, an open scrim can be formed, in which the optical fiber is inserted in a straight manner to minimize yarn crimp.

One representative example of a weft-inserted warp knit fabric is shown in FIG. 6. Optical fiber 4 is used as the weft of optical fiber substrate 60. The warp yarns 66 are preferably comprised of non-optical fibers of one or more types previously provided. The stitch yarns 68, which are shown forming a tricot stitch, are preferably the same fiber type as warp yarns 66, but preferably are of a smaller denier (smaller diameter yarn) than warp yarns 68. For instance, by way of example only, warp yarns 66 may be 1000 denier high tenacity polyester, while stitch yarns 68 are polyester with a size of between 70 and 150 denier. As shown, more stitches than weft yarns may be used in optical substrate 60 (that is, stitch yarn 68 is connected to warp yarns 66 more often than stitch yarn 68 connects warp yarns 66 to optical fiber 4). The number of stitches between optical fiber weft inserts may vary, depending on the machine set-up, the bending radius of the optical fibers, and the desired construction. Tricot, flat, or combination stitches may be used. The general construction ranges previously mentioned for scrims apply to weft-inserted scrims as well.

Alternately, a multi-axial warp knit scrim could also be manufactured so that the optical fiber could be laid in at an angle similarly to tri-axial scrims.

Stitch-Bonded Scrims

As a further alternate embodiment, a stitch-bonded scrim can be formed in a similar manner to a weft inserted warp knit fabric, and so are subject to similar constraints. However, the scrim is attached to an additional layer, such as a nonwoven. The attachment is made by the knitting needles that directly stitch the scrim to the nonwoven, as the scrim is being produced. Such a construction is illustrated in FIG. 7.

In FIG. 7, optical fiber 4 comprises the weft of the textile. In this embodiment, the warp yarns are optional (and are not shown). A flexible rolled good 16, such as a nonwoven fabric or film, is secured to the scrim as it is formed to form composite 70. In this case, substrate 16 provides structural support so that the warp yarns may be optional. Layer 16 may be comprised of a variety of materials such as a nonwoven, a single or multi-layer film, a woven or knit fabric layer (closed or open construction), a foam layer, a foil, a paper layer, a composite layer, and the like, depending on the properties desired in the final product. This embodiment is similar to that shown in FIG. 5A, except that in FIG. 7 the scrim is a weft-inserted scrim rather than a nonwoven scrim. Stitch yarns 68 secure the optical fiber 4 to layer 16.

With these fabric formation technologies (weft-inserted warp knitting and stitch-bonding), twisting of the weft inserted yarn and resulting kinks in the yarn may cause breakage of the yarns and loss of optical continuity. As described previously, roll-off mechanisms, or other means of controlling the twisting and sloughing of the yarn, are preferably employed.

For both the weft inserted warp knit and stitch-bonded scrims, an alternate embodiment for which the optical fiber path extends in the machine direction in parallel paths can be obtained by forming a warp beam in which the optical fiber replaces one or many of the conventional warp yarns at whatever spacing is desired. Using this approach, optical fibers can be made to traverse the length of the scrim. Again, the optical fiber is preferably incorporated into the scrim construction in a fairly straight manner to minimize yarn crimp. As yet another alternate embodiment, similar to that shown in FIG. 2, separate optical fibers can be placed into the fabric construction both in the machine direction as well as in the cross-direction.

Woven Scrims

Another, but less preferred, method of making an optical fiber scrim is by weaving. A woven optical fiber scrim 80 is made using a projectile weaving machine, which allows for a sinuous path for optical fiber 4. Optical fiber 4 is fed over and under warp yarns 26, which are preferably of a fiber type other than an optical fiber. Alternately, as before, warp yarns 26 may be of a single fiber type or of a combination of fiber types and may also include an optical fiber as one component. This construction may be less preferred for some applications, because of the crimp that is induced into optical fiber 4 by weaving it through warp yarns 26. For woven scrims, the general range of scrim constructions mentioned previously apply.

Optical Fiber Scrim-Containing Composites

It is anticipated that any of the preceding reinforcement fabrics could be attached to additional layers of material to form a composite, as shown in representative form in FIGS. 9A and 9B. Such composites may be engineered to provide shock absorption, durability, structural support or load carrying ability, thermal properties, impact resistance, abrasion resistance, chemical encapsulation, selected chemical permeability, diffusion layers, stiffness, and various other properties as may be desired.

The layers that optionally may be attached to the scrim with incorporated optical fiber include substrates that are flexible roll-goods, semi-flexible substrates, or rigid substrates. In the final composite, there may be components represented from one, two, or all of these groups.

Examples of flexible roll-goods include nonwovens, other textile fabrics such as wovens, knits, or additional scrim layers, films, foils, foams, paper, or other suitable materials. The nonwovens, fabrics, and scrims may be made of polyolefin, polyester, polyamide, fiberglass, or other materials known in the art. Films may be made of thermoplastics, such as polyolefin, polyester, polyamide, or others known in the art. Foils may be made of metals of various sorts. Foams may be made of a variety of open or closed cell foams, such as polyurethane, polystyrene, polyisocyuranate, foam rubber, and others known in the art.

Some of these materials may be used to absorb impact energies, thereby protecting the optical fiber scrim from mechanical abuse. These materials are termed "energy-absorbing" materials. This group of materials includes open and closed cell foams, nonwovens, rubber and gel materials, and spacer fabrics (three-dimensional textiles with yarns running in the compression direction, typically monofilaments, that provide compression and recovery).

To protect the optical fiber from mechanical abuse that is concentrated in a small area, a stress-distributing material may be included in the composite. These materials tend to be semi-rigid or rigid materials that spread impact forces over a wider area. Examples of semi-flexible substrates can include metal sheets, composite lay-ups, and the like. Examples of rigid substrates can include metal panels; wood products such as plywood, oriented strand board, or the like; gypsum or cementitous panels; ceramic panels; thermoplastic or thermosetting polymeric panels; and other materials known in the art.

The additional layers may be used to provide a solid structure with which to deploy the article, absorb impact to protect the optical fiber substrate, provide electrical isolation, provide requisite thermal properties, or provide other performance properties as desired. Such structures are shown in FIGS. 9A and 9B, in which optical fiber substrate 10 is sandwiched between layers of other materials to create composites 90 and 92. In FIG. 9A, optical fiber substrate 10 is positioned between opposing layers 100 of a stress-distributing material. The layers may be secured with an adhesive (not shown) or, optionally, thermally bonded or welded. In FIG. 9B, optical fiber substrate 10 is positioned between opposing layers 102 of an energy-absorbing material. Layers 100 of stress-distributing material further enclose the composite structure. Again, the layers are secured to one another with an adhesive, thermal bonding, welding, or other methods known to those of skill in the art.

As has been previously described, the layers 100, 102 may be any of a number of different materials. Opposing layers may be of the same material or of different materials, selected based on the intended use of composite structure 40 or 42. Additionally, although the structures illustrated are symmetrical, symmetry is not a requirement (that is, there may be more layers below the optical fiber substrate than above it, or vice versa). There also is no requirement that another layer cover the optical fiber scrim. Although composites 40 and 42 are illustrated with optical fiber substrate 10 as the functional component, other optical fiber substrates or fiber substrate composites (such as are shown in FIGS. 2, 3A, and 3B) may also be used. In some instances, the use of multiple optical fiber scrims may be desirable within the same composite.

EXAMPLE

Using a single-arm machine, a bi-directional texile scrim material was produced at a width of 49 inches. The warp yarn sets each contained 120 500-denier polyester yarns. The selvage yarns were 1500 denier polyester yarns, so that higher tension could be applied to the selvage areas to hold the fiber optic fabric at the appropriate width and position the fiber optic yarn properly within the fabric construction. The cross-directional yarn, which was a continuous PVC-coated optical fiber, available from Corning as Part Number 001E41-31131-24, was delivered on a spool with flanges on each end.

Single release screws were used to feed the optical fiber between the warp yarn sets at a spacing of one fiber per inch. Care was taken to minimize the amount of twist that was introduced into the optical fiber. It was discovered that twisting often causes kinks in the optical fibers, which may further lead to breakage. An additional concern is that twisted yarns can become tangled in the accumulator, causing the machine to shut down. To alleviate these problems, the optical fiber was fed to the accumulator from the spool, which was positioned inside a containment vessel with an opening in its lid. This had the effect of keeping the optical fiber from sloughing off the pack and twisting or kinking and reduced impulse forces on the optical fiber. Based on the trial, it was also contemplated that a driven roll-off would effectively introduce the fiber optic into the accumulator, while minimizing twisting and breakage.

Another problem encountered in manufacturing was the effect of impulse forces on the optical fiber. Initial efforts to feed the optical fiber into the warp yarn sets resulted in the optical fiber being broken, simply from the force of pulling the fiber from the spool. It was found that a yarn accumulator alleviated this problem by buffering the impulse force to the fiber optic package. Finally, twisted yarns tend to shift, sometimes significantly, during fabric formation, resulting in a fabric with irregular yarn geometry (that is, yarn straightness and pattern regularity).

The resulting fiber optic substrate was then dipped into a chemical pad, containing a solution of polyvinyl alcohol adhesive. The PVA was dried using a series of six steam cans operating at a temperature of 300° F. The adhesive successfully bonded the PVC-coated optical fiber to the polyester (warp) yarns at a pick-up rate of about 12-15% by weight.

Testing

Initial lab testing of the optical fiber scrim of the Example was conducted to determine whether the light transmission capabilities of the fiber optic had been preserved throughout the scrim manufacturing process. Using a laser diode (Thorlabs Model CPS 180, 635 nm wavelength, 1 mW power output), a silicon detector (Newport Model 883-SL), and some fiber optic couplings, an optical circuit and sensor system was created, using an approximately 18-inch long piece of the adhesively bonded optical fiber scrim. As shown in FIG. 10. the light source 1 (in this example a laser diode) was connected to a coupling 2 which directed the light into a first side of the optical fiber 4 in the optical fiber substrate 10. The light exited the optical fiber 4 at the second side of the optical fiber 4 and was directed into a detector 3 (in this example a power meter).

The laser light was directed through the coupling and into the optical fiber, which was incorporated through the scrim. The laser light could be seen projecting out of the fiber optic at the end opposite the laser. Thus, it was clear that the manufacturing process was capable of producing a scrim fabric without damaging the optical fiber.

To test the sensing properties of the optical fiber scrim, the exit end of the fiber optic was mounted so that the light emitted from the end of the fiber was directed into a power meter (Newport Model 1815-C). The power attributable to laser light being emitted from the fiber was measured at 2.4 nW. This measurement was fairly stable over a period of time. Then, the optical fiber scrim was flexed in various places, causing the power meter readings to vary. At one point, the power measurement dropped to 1.4 nW. When the pressure that caused the drop in power levels was released, the power reading returned to the original level. This testing shows that the fiber optic scrim was sensitive to even local bending or flexing.

In conclusion, the present optical fiber scrims represent a useful advancement over the prior art. Modifications and variations to the products and processes described herein may be practiced by those of ordinary skill in the art, without departing from the spirit and scope of the present disclosure. Furthermore, those of ordinary skill in the art will appreciate that the foregoing description is by way of example only, and is not intended to limit the scope of the appended claims.

We claim:

1. An optical circuit and sensor system comprising:
  an optical fiber scrim comprising at least one warp yarn set having at least two warp yarns and at least one crossing yarn that crosses said warp yarn set in a sinuous path across the warp yarn set, wherein at least one of said crossing yarns is an optical fiber, and wherein said optical fiber has a change in light transmission characteristics when exposed to one or more sources selected from the group consisting of mechanical agents, chemical agents, moisture, temperature, pH changes, biological sources, neutrons, and ionizing radiation;
  a light source and coupling connected to a first end of the optical fiber in the optical fiber scrim such that the light from the light source is directed through the coupling into the first end of the optical fiber; and, a detector connected to a second end of the optical fiber, the second end of the optical fiber being the end of the fiber opposite to the first end of the fiber, wherein the detector measures the light emitted from the optical fiber.

2. The optical circuit and sensor system of claim 1, wherein said optical fiber scrim has a construction selected from the group consisting of an adhesively bonded laid scrim, a thermally bonded laid scrim, a woven scrim, a weft-inserted warp knit scrim, a multi-axial knit scrim, a stitch-bonded scrim, and a cross-plied scrim.

3. The optical circuit and sensor system of claim 1, wherein said warp yarn set has yarns that are present in an amount of between about 1 yarn per every 60 inches and about 25 yarns per inch.

4. The optical circuit and sensor system of claim 1, wherein said warp yarn set has yarns that are present in an amount of between about 1 yarn per 30 inches and about 12 yarns per inch.

5. The optical circuit and sensor system of claim 1, wherein said optical fiber has a core made of a material selected from the group consisting of glass and polymers.

6. The optical circuit and sensor system of claim 1, wherein the optical fiber is of a type selected from the group consisting of single mode fibers, multi-mode fibers, light pipes, photosensitive fibers, polarization-maintaining fibers, multiple step-indexed fibers, graded index fibers, reduced cladding fibers, high index fibers, wave-guiding films, and photonic lattice fibers.

7. The optical circuit and sensor system of claim 1, wherein said optical fiber is a single-mode fiber.

8. The optical circuit and sensor system of claim 1, wherein the optical fiber comprises a compressible sheath.

9. The optical circuit and sensor system of claim 1, wherein more than one optical fiber crosses said warp yarn set.

10. The optical circuit and sensor system of claim 1, wherein said optical fiber scrim comprises a plurality of said crossing yarns, said crossing yarns being selected from the group consisting of polyesters, polyamides, polyolefins, ceramics, fiberglass, aramids, cotton, wool, metal, carbon, and combinations thereof.

11. The optical circuit and sensor system of claim 1, wherein said warp yarn set comprises yarns selected from the group consisting of polyesters, polyamides, polyolefins, ceramics, fiberglass, aramids, cotton, wool, metal, carbon, optical fibers, and combinations thereof.

12. The optical circuit and sensor system of claim 11, wherein said warp yarn set further comprises at least one optical fiber.

13. The optical circuit and sensor system of claim 1, wherein the optical fiber has a square pattern construction.

14. The optical circuit and sensor system of claim 1, wherein said optical fiber scrim has a tri-axial pattern construction.

15. The optical circuit and sensor system of claim 14, wherein said tri-axial optical fiber scrim has a construction in which said crossing yarns are present in an amount of between about one of said crossing yarns per six inches and about four of said crossing yarns per inch in an upward diagonal direction and a downward diagonal direction.

16. The optical circuit and sensor system of claim 1, wherein the optical fiber scrim is an adhesively bonded scrim.

17. The optical circuit and sensor system of claim 16, wherein said optical fiber scrim is attached to a flexible carrier sheet, said carrier sheet being selected from the group consisting of films, foils, nonwoven fabrics, woven fabrics, and knit fabrics.

18. The optical circuit and sensor system of claim 1, wherein said optical fiber scrim comprises at least 2 different types of optical fibers.

* * * * *